United States Patent [19]

Knight

[11] 4,080,774
[45] Mar. 28, 1978

[54] MOWER

[75] Inventor: Roy George Knight, Thebarton, Australia

[73] Assignee: Scott Bonnar Limited, Thebarton, Australia

[21] Appl. No.: 709,767

[22] Filed: Jul. 29, 1976

[51] Int. Cl.$^2$ .............................. A01D 53/06
[52] U.S. Cl. ............................................ 56/199
[58] Field of Search ............. 56/202, 194, 198, 199, 56/200, 252, 14.3

[56] References Cited

U.S. PATENT DOCUMENTS

| 383,632 | 5/1888 | Crosier | 56/199 |
| 404,690 | 6/1889 | Deland | 56/199 |
| 406,433 | 7/1889 | Deland | 56/199 |
| 2,471,975 | 5/1949 | Packwood | 56/14.3 |

FOREIGN PATENT DOCUMENTS 1,136,471 12/1968 United Kingdom ............... 56/199

*Primary Examiner*—Russell R. Kinsey
*Attorney, Agent, or Firm*—Lawrence E. Sklar

[57] ABSTRACT

A lawn mower of the cutter reel type having a free running front roller, a driven rear roller and a cutter reel therebetween, the catcher being positioned rearwardly of the rollers, the rear roller being adjacent a lower deflector plate which deflects grass cuttings upwardly and rearwardly from the reel above the rear roller and into the catcher.

5 Claims, 2 Drawing Figures

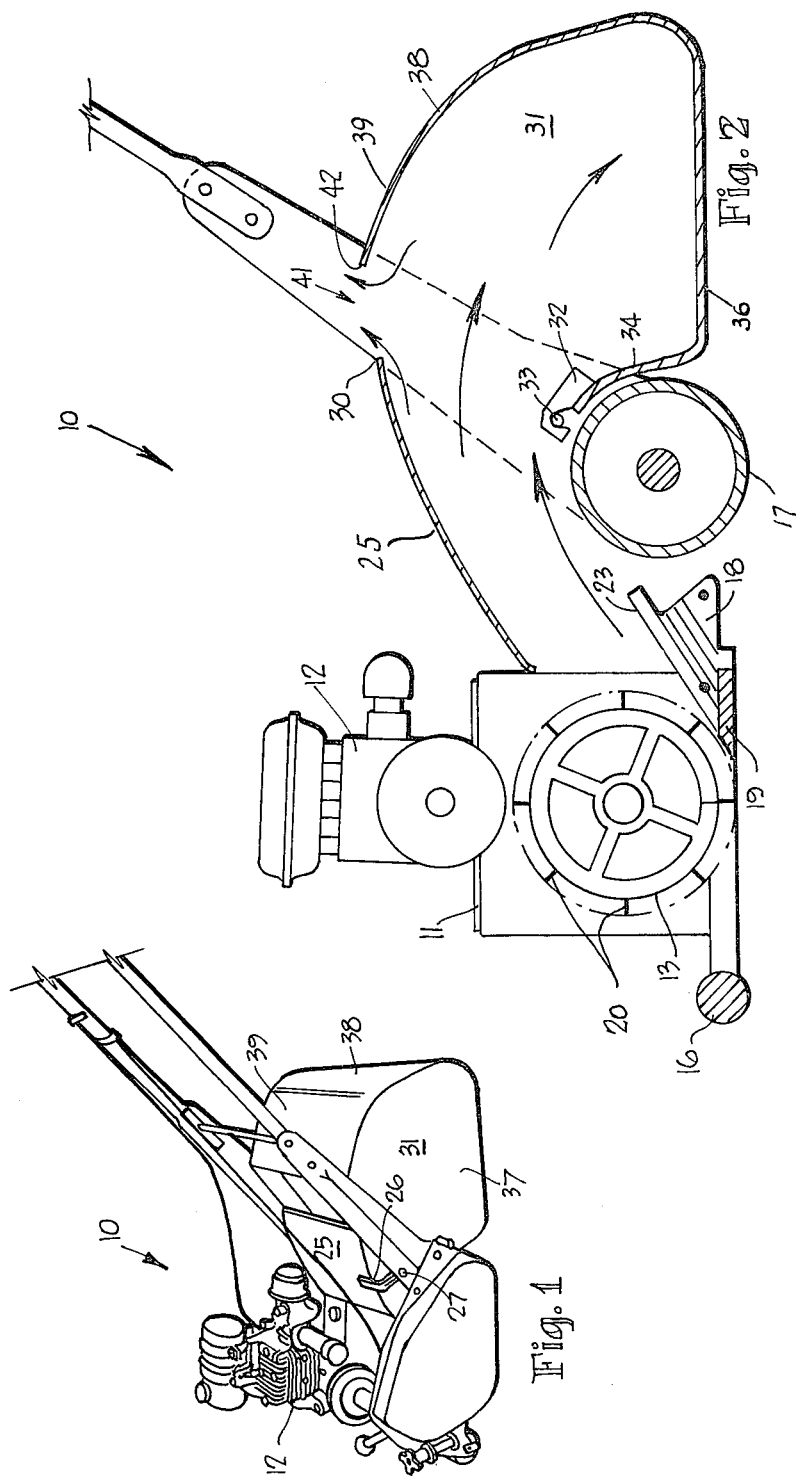

MOWER

This invention relates to a mower of the reel type.

Mowers of the reel type are normally provided with deflector plates which deflect the cut grass into a forwardly carried catcher. It is known that certain very old mowers of the type with individual side mounted wheels have been provided with rearwardly extending catchers, but these have been of an open type and have not been suitable for use with power operated reel mowers. Egress of grass cuttings rearwardly from a power reel mower are obstructed by a large diameter, full width driving roller and it is for this reason that forwardly mounted catchers are normally employed.

In the passage of grass cuttings from the mower reel to the catcher, considerable energy is dissipated due to friction and impact of the grass cuttings against the deflecting chute, and consequently the grass is loosely packed in the catcher. One of the objects of this invention is to provide an arrangement whereby the grass will be more firmly packed in a catcher, and thereby reduce the frequency of discharging the contents.

When a grass catcher is positioned forwardly of a reel in a mower, the maneuverability of the mower is reduced and for example it is difficult to cut grass alongside a wall unless the mower is moved in a direction parallel to the wall. Similar difficulties occur in cutting grass under trees and shrubs when the mower has to be moved under low branches and the grass catcher becomes an obstruction and may be dislodged by contact with the branches. A further object of the invention is to provide improvements whereby a mower is more maneuverable and also at the same time more compact.

A further problem which is encountered with mowers having large grass catchers which are positioned forwardly of the reel is that the balance of the mower is not good and considerable effort is required to vary direction of the mower. If the balance is incorrect, there is a further danger that the front roller loading will increase as the front catcher box fills, and on very spongy lawn the depth of cut will increase. A further object of the invention therefore is to provide a mower having a better balance around the rear roller which functions as a fulcrum.

According to the invention a lawn mower comprises a frame, a cutter reel journalled for rotation in bearings in the frame, a cutter blade fixed relative to the frame, an engine positioned above the cutter reel, a front roller parallel to and positioned forwardly of said cutter reel, a rear driving roller parallel to said cutter reel and disposed rearwardly therefrom, drive means coupling the engine to both the cutter reel and rear roller, and a catcher mounted on said frame and positioned rearwardly of the roller, the mower having upper and lower deflector plates, said rear roller being positioned adjacent said lower deflector plate, the lower deflector plate being arranged to deflect grass cuttings upwardly and rearwardly from the reel, above the rear roller and into the catcher, the upper deflector plate also being arranged to deflect grass cuttings into the catcher. Conveniently the lower deflector plate may constitute the sole plate and the upper deflector plate may either be a plate secured to the mower frame, or a plate secured to the catcher. If the roller is positioned slightly rearwardly of the sole plate, a portion of the roller surface may also function as a deflector surface.

An embodiment of the invention is described hereunder in some detail with reference to the accompanying drawings in which:

FIG. 1 is a side perspective view of the mower, and
FIG. 2 is a partly sectioned side elevation.

In this embodiment a mower 10 is provided with a frame 11 which carries an engine 12 positioned above a cutter reel 13 journalled in bearings (not shown) in the frame 11, there being a drive means (not shown) from the engine 12 to the cutter reel 13, the drive means also coupling the engine to the rear roller for propulsion. The drive may if desired include a clutch (not shown) either of the manually or centrifugally operated type. The frame 11 also has a relatively small diameter front roller 16 positioned forwardly of the cutter reel 13 and a relatively large diameter roller 17 positioned rearwardly of the cutter reel 13, the rollers 16, 17 being respectively parallel to the cutter reel. The frame supports a sole plate 18 which itself carries the bottom or ledger blade 19 which co-operates with the multiple blades 20 on the cutter reel 13 to effect the cutting of the grass. Alternatively the bottom blade and sole plate may be integral.

The sole plate 18 is provided with an upwardly sloping upper surface 23 which constitutes a deflector surface, so that the sole plate is also a lower deflector plate, while the mower is provided with an upper deflector plate 25 having attachment means 26 which engage corresponding attachment means 27 on the frame 11, the upper deflector plate 25 also sloping upwardly and rearwardly but sweeping in a curve to a more nearly horizontal position at its rear edge 30.

A grass catcher 31 is provided with attachment means 32 for attaching to complementary means 33 on the mower frame, the grass catcher 31 having a relatively shallow front wall 34 curved to be positioned adjacent to but not to touch the rear surface of the rear driving roller 17, and a base 36 and two side walls 37, the base 36 however, being curved upwardly and then forwardly to provide a rear wall 38 for the catcher, the rear wall terminating in a forwardly curved portion 39. A space 41 exists between the forward edge 42 of the portion 39 of the catcher 31 and the rear edge 30 of the upper deflector plate 25 to allow egress of air which is swept upwardly into the catcher together with the grass cuttings when the mower is used. In the alternative however, the upper deflector plate 25 may be a portion of the catcher and may have its forward edge resting on or guided by support means (not shown) on the frame 11. The space between the rear edge 30 of the upper deflector plate 25 and the front edge 42 of the rear wall portion 39 of the catcher may be replaced by an opening which can for example be partly closed with a screen of known type.

A brief consideration of the above embodiment will indicate that the invention provides a mower which is relatively compact and wherein there is a substantially short distance between the axis of the driving roller (which functions as the mower fulcrum) and the centre of gravity of the grass catcher when full of grass cuttings. This provides an excellent balance for the mower which makes it easy to use and avoids the sole plate and its cutter blade increasing the depth of cut on spongy lawns. Furthermore, the machine is more maneuverable and is more useful in cutting grass adjacent obstructions such as walls, trees or the like. It is found that the more direct and higher velocity throws of the grass cuttings into the catcher result in a better packing of the grass cuttings and consequently the catcher is able to contain a greater weight of grass cuttings than a similar size catcher if front mounted.

I claim:

1. A lawn mower comprising a frame, a cutter reel journalled for rotation in bearings in the frame, a cutter blade fixed relative to the frame, an engine positioned above the cutter reel, a front roller parallel to and positioned forwardly of said cutter reel, a rear driving roller parallel to said cutter reel and disposed rearwardly therefrom, drive means coupling the engine to both the cutter reel and rear roller, and a catcher mounted on said frame and positioned rearwardly of the rear roller, the mower having upper and lower deflector plates, said rear roller being positioned adjacent and rearwardly of said lower deflector plate, a portion of the surface of said rear roller also being a grass deflector surface which together with said lower deflector plate form lower deflector means between the cutter blade and grass catcher, the lower deflector means being arranged to deflect grass cuttings such that they move upwardly and rearwardly from the reel, above said grass deflecting surface of the rear roller and into the catcher, the upper deflector plate being above and spaced from the lower deflector plate and rear driving roller and sloping upwardly and rearwardly, the upper deflector plate also being arranged to deflect grass cuttings into the catcher.

2. A lawn mower according to claim 1 wherein the catcher has a rear wall and wherein there is an air egress space between the upper forward edge of the rear wall of the catcher, and attachment means attaching said upper deflector plate to said frame.

3. A lawn mower according to claim 1 wherein the upper deflector plate is curved in longitudinal section, having its uppermost surface convex.

4. A lawn mower according to claim 1 wherein there is a sole plate and means securing the sole plate to said frame, said fixed cutter blade being secured to the sole plate.

5. A lawn mower according to claim 4 wherein the sole plate is also the lower deflector plate.

* * * * *